(12) United States Patent
Dong (10) Patent No.: US 10,417,521 B2
(45) Date of Patent: Sep. 17, 2019

(54) MATERIAL HANDLING SYSTEM AND METHOD

(71) Applicant: JCS-Echigo Pte Ltd, Singapore (SG)

(72) Inventor: Junfeng Dong, Singapore (SG)

(73) Assignee: JCS-Echigo Pte Ltd, Singapore (SG)

( * ) Notice: Subject to any disclaimer, the term of this patent is extended or adjusted under 35 U.S.C. 154(b) by 0 days.

(21) Appl. No.: 14/485,420

(22) Filed: Sep. 12, 2014

(65) Prior Publication Data

US 2015/0081090 A1 Mar. 19, 2015

(30) Foreign Application Priority Data

Sep. 13, 2013 (SG) .................................. 201306989

(51) Int. Cl.
*B07C 5/00* (2006.01)
*G06K 9/62* (2006.01)
*B65G 43/08* (2006.01)
*B25J 15/06* (2006.01)
*B25J 13/08* (2006.01)
*G06T 19/20* (2011.01)
*B07C 5/342* (2006.01)
*B65G 47/91* (2006.01)

(52) U.S. Cl.
CPC ................. *G06K 9/62* (2013.01); *B07C 5/00* (2013.01); *B07C 5/3422* (2013.01); *B25J 13/08* (2013.01); *B25J 15/065* (2013.01); *B65G 43/08* (2013.01); *G06T 19/20* (2013.01); *B65G 47/91* (2013.01); *G05B 2219/40036* (2013.01); *G05B 2219/45047* (2013.01); *G06T 2207/20224* (2013.01)

(58) Field of Classification Search
CPC ...... B25J 15/065; B25J 13/08; B25J 15/0616; B07C 5/3422; B07C 5/00; G06K 9/62; G06K 9/6209; G06F 17/30259; B65G 43/08

See application file for complete search history.

(56) References Cited

U.S. PATENT DOCUMENTS

| | | | | |
|---|---|---|---|---|
| 5,641,072 A * | 6/1997 | Otake | ....................... | B07C 5/10 |
| | | | | 198/396 |
| 5,765,444 A * | 6/1998 | Bacchi | ..................... | B25J 9/042 |
| | | | | 414/744.5 |
| 5,999,641 A * | 12/1999 | Miller | ..................... | G06T 9/001 |
| | | | | 382/154 |
| 6,956,963 B2 * | 10/2005 | Ulrich | ................ | G01B 11/2513 |
| | | | | 257/E21.001 |

(Continued)

*Primary Examiner* — Thomas Randazzo (57) ABSTRACT

A system and method for material handling are disclosed. The system includes a platform for receiving a plurality of articles, a plurality of sorting bins that each correspond to an article type, an object recognition system for identifying the article on the platform and categorizing the article by a specific article type, and an article engagement assembly. The object recognition system includes a 3D detector for detecting the article and a database containing data on characteristics of article types. The 3D detector is arranged to capture at least one two-dimensional image, and at least one depth image of the article. The article engagement assembly engages and delivers the article to the corresponding sorting bin. The object recognition system is arranged to identify the article based upon the data within the database and instructs the article engagement assembly to engage and place the article in the sorting bin.

14 Claims, 7 Drawing Sheets

(56) References Cited

U.S. PATENT DOCUMENTS

| | | | | |
|---|---|---|---|---|
| 7,110,590 | B2* | 9/2006 | Nordbryhn | B07C 5/3408 348/125 |
| 7,313,464 | B1* | 12/2007 | Perreault | B25J 9/1666 318/568.1 |
| 7,353,954 | B1* | 4/2008 | Malek | B07C 5/3404 198/400 |
| 7,565,008 | B2* | 7/2009 | Boncyk | G06K 9/228 382/165 |
| 7,953,277 | B2* | 5/2011 | Williams | G06T 5/50 382/173 |
| 8,560,460 | B2* | 10/2013 | Mallett | B07C 7/005 705/308 |
| 8,753,059 | B2* | 6/2014 | Baker | B65G 1/06 211/85.13 |
| 8,794,524 | B2* | 8/2014 | Connell, II | G06K 7/10554 235/462.01 |
| 8,862,269 | B2* | 10/2014 | Martinez | B25J 9/1687 200/245 |
| 8,918,203 | B2* | 12/2014 | Gilchrist | B25J 9/042 700/228 |
| 9,002,507 | B2* | 4/2015 | Mattem | B25J 13/08 700/213 |
| 9,111,979 | B2* | 8/2015 | Fairbairn | H04N 7/18 |
| 9,349,297 | B1* | 5/2016 | Ortiz | H04N 7/18 |
| 9,501,725 | B2* | 11/2016 | Vrcelj | G06K 9/78 |
| 2005/0038556 | A1* | 2/2005 | Gagnon | A61B 90/90 700/226 |
| 2008/0181485 | A1* | 7/2008 | Beis | B25J 9/1697 382/153 |
| 2009/0174805 | A1* | 7/2009 | Alberth, Jr. | H04N 5/23212 348/345 |
| 2013/0151007 | A1* | 6/2013 | Valpola | B25J 9/1694 700/245 |
| 2014/0154036 | A1* | 6/2014 | Mattem | B25J 9/1612 414/729 |
| 2014/0197652 | A1* | 7/2014 | Wang | B25J 9/042 294/185 |
| 2014/0365002 | A1* | 12/2014 | Nichols | B65G 47/48 700/240 |
| 2015/0066200 | A1* | 3/2015 | McCarthy | B07C 5/3422 700/223 |
| 2015/0071737 | A1* | 3/2015 | Hofmeister | B25J 9/042 414/217 |
| 2015/0347801 | A1* | 12/2015 | Svetal | G06K 7/1447 235/454 |
| 2016/0077670 | A1* | 3/2016 | Short | G06F 1/1605 345/175 |
| 2016/0239154 | A1* | 8/2016 | Suggs | H04N 9/3194 |

* cited by examiner

MATERIAL HANDLING SYSTEM AND METHOD

CROSS-REFERENCE TO RELATED APPLICATIONS

This application claims priority to Singapore Application No. SG 201306989-3 filed with the Intellectual Property Office of Singapore on Sep. 13, 2013 and entitled "MATERIAL HANDLING SYSTEM AND METHOD," which is incorporated herein by reference in its entirety for all purposes.

FIELD OF THE INVENTION

The invention relates to the handling of articles and material including the identification and correct sorting of the articles.

BACKGROUND

An industrial scale conveyor, handling articles for washing and subsequent sorting, needs to maintain an economic rate, based upon the required number of articles per second on the conveyor. To manage this manually requires a sufficient number of operators, proportional to the rate of articles requiring sorting.

One method of managing the rate of articles is to automatically sort the articles as they reach a particular zone either robotically or through mechanical sorting means.

However, this is not effective if the articles are different with the number of categories of articles progressively increasing the complexity of the sorting process.

One such application is for an industrial dish washer whereby the articles may be normal crockery (e.g plates, cups, sauces and bowls) and cutlery (e.g fork, knife, spoon, chopsticks etc). A further complexity includes sourcing said articles from different locations. Using the dishwasher analogy further, a bowl from one source may be completely different from a bowl from another source and in fact each source may have several different types of bowls.

Accordingly, mechanical sorting based on shape is not viable and so opportunities for automatic sorting and so operating the conveyor at an economic rate according to the prior art is unavailable.

SUMMARY OF INVENTION

In one aspect the invention provides a material handling system comprising: a platform for receiving a plurality of articles; a plurality of sorting bins, each bin in corresponding to an article type; an object recognition system for identifying an article on the platform and categorizing said article by specific article type; said 3D object recognition system including a 3D detector for detecting said article and a database containing data on characteristics of article types; an article engagement assembly for engaging and delivering said article to said corresponding sorting bin; wherein the object recognition system is arranged to identify the article based upon the data within said database and instructs the article engagement assembly to engage and place the article in said sorting bin.

In a second aspect the invention provides a method for identifying and sorting an article, said method comprising the steps of: detecting the presence of the article by a 3D detector; comparing detected article with data contained in a database; locating the position and orientation of the article from the 3D image and transformed such information into robot coordinate frame; categorizing said article as a specific article type based upon said comparison.

Accordingly, by using an object recognition system in communication with a database identifying articles by category, the invention provides a robotic and therefore automatic sorting system.

In one embodiment, the platform may be a carriage, tray or crate. Alternatively, the platform may be located on a conveyor, such as the surface of the conveyor or a carriage moved by said conveyor. This arrangement may provide the advantage of operating the conveyor at an economic rate possibly beyond that of multiple operators sorting manually.

For the platform being a tray or crate, said platform may be part of a set of shelves delivered within a movable array of said trays or crates, with said system directed to handle the articles from said trays or crates.

For the purpose of simplifying the description, reference to the platform being part of a conveyor will be used, on the understanding that the platform is not limited to a conveyor, but may also refer to the platform being a tray, crate or carriage.

The database may list articles by image with each article determined by a range of perimeters which may include category (e.g bowl), source (e.g specific restaurant) and/or type (e.g soup bowl). The database may further include other perimeters based upon a range of criteria which may be by manufacturing brand or merely by external dimensions.

The database may contain the article information which may include at least one image of the article. Preferably, there may be several images of the article taken from different angles so as to facilitate the object recognition system correctly identifying the articles irrespective of the orientation on the conveyor.

To this end, the object recognition system may include a camera which may be a 3D camera providing depth information on the article. Alternatively, or in combination with a camera derived system, the object recognition system may include an electronic or digital tagging system such as an RFID tag, a barcode or a QR code system placed upon each article. The system according to the present invention may therefore have an ID recognition system such as a barcode reader, RFID reader etc located adjacent to the conveyor for identifying the ID information on the targeted article. When used in combination with a camera, the two systems may be used to confirm an identity and/or act as a redundancy system. Having the two systems in combination may also act to reduce the margin of error which may allow the operator to increase the speed of the conveyor within a wider confidence margin.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

For the purpose of simplifying the following examples, reference is made to a conveyor, which in this case will be the conveyor. It will be appreciated that the platform is not limited to a conveyor, but may also refer to the platform being a tray, crate or carriage either in association with a conveyor or used distinctly from a conveyor.

Figure 1:
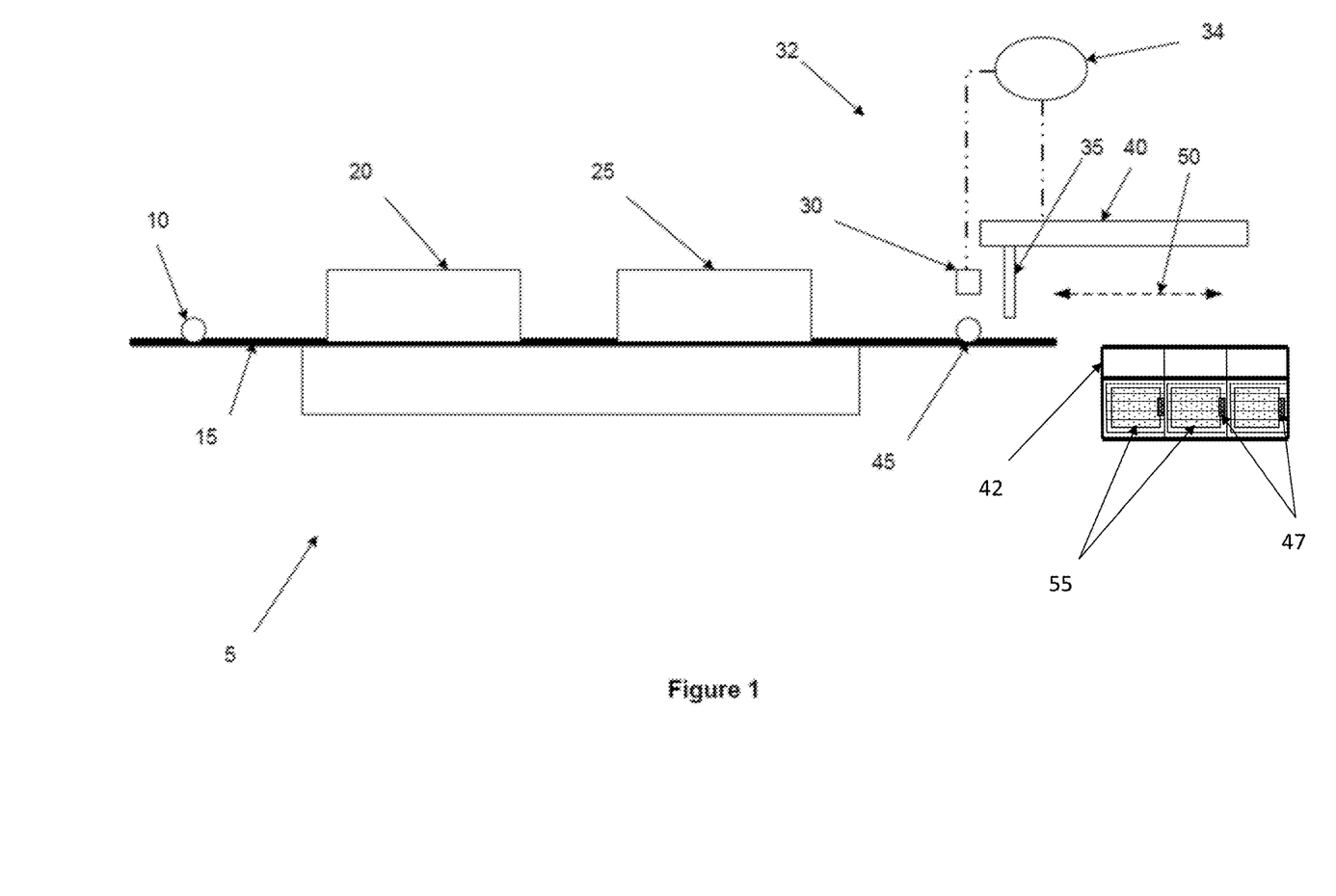
FIG. 1 is a schematic view of the system having a conveyor according to one embodiment of the present invention.

FIG. 1 shows a material handling system, which in this case is a conveyor system 5. In general, the platform upon which the articles are received may be the surface of the conveyor 15, a carriage upon the conveyor or a crate/tray placed on the conveyor.

Articles 10 are loaded onto the conveyor 15. For this particular example, the conveyor system 5 is arranged with an industrial dishwasher and so includes a washing station 20 and drying station 25 through which the article 10 passes. Central to the invention is an object recognition system 32 comprising a detector 30, in this case a 3D camera for targeting an article 45. The camera 30 is connected to a control system and database 34 which compares the article 45 to a database of images in order to identify the type of article.

Figure 3:
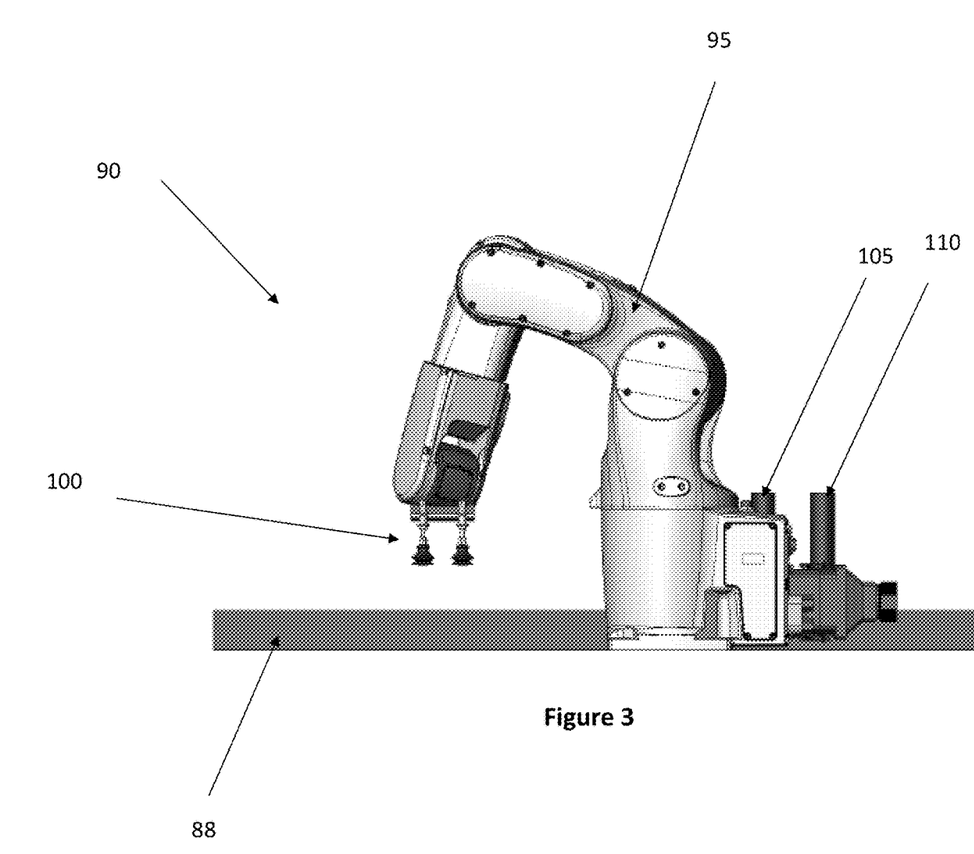
FIG. 3 is an isometric view of a sorting system according to one embodiment of the present invention.

The control system 34 then engages an end-effector 35 which in this case is engaged with a linear slide 40. It will be appreciated that movement of the end-effector 35 may vary with FIG. 3 showing a further embodiment of the drive system for the end-effector.

The end-effector engages the article 45 and moves 50 whereupon the article 45 is placed within one of a series of sorting bins 55 with the sorting bin corresponding to the article type as determined by the control system 34.

The sorting bins may be basket-like containers placed on sliding base with security fences 42 covered around. This security fences 42 may be locked by electro-magnet lock 47 controlled by system digital I/O output. In addition, each sorting bin may be mounted with manual push button and proximity sensors to detect the loads of placed articles.

Either push buttons may be pressed or the proximity sensor senses that the sorting bin is full, the robot will not place additional articles into this bin any more while the security lock will be released so that operators can pull the full-loaded sorting bin from the security fences. After the empty sorting bin is replaced and the security lock is locked again, the robot arm will start placing articles into this sorting bin again. This design protects operators and robot arms so that operators can safely remove full-loaded sorting bin from the system.

Figure 2A:
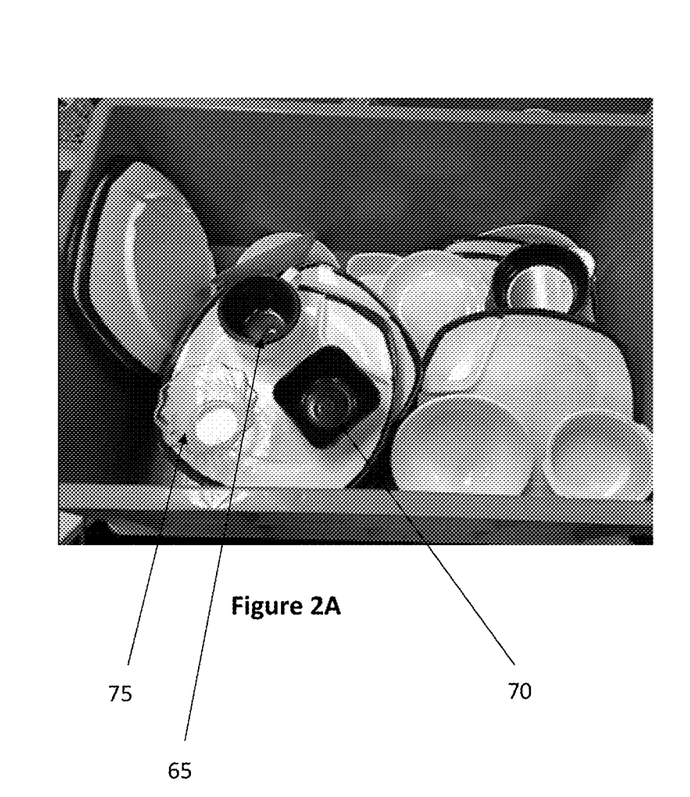
FIG. 2A is a photographic image captured by the conveyor system.
Figure 2B:
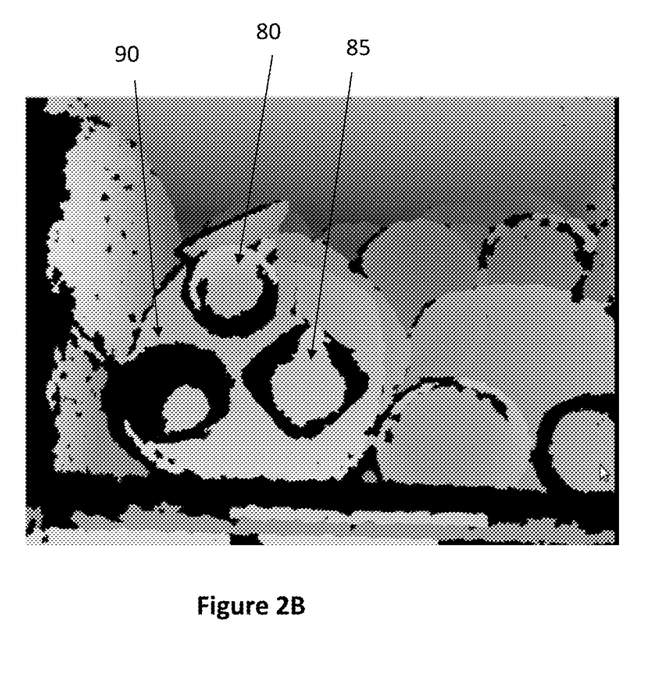
FIG. 2B is a raw depth image captured by the conveyor system according to a further embodiment of the present invention.

In a further embodiment the object recognition system may be visual whereby the detector is a camera such as a 3D camera. FIGS. 2A and 2B show images captured by a 3D camera for an object recognition system. In particular, there is shown a crate 60 in which the articles are placed on the conveyor. Within the crate is a cup 65, a type of bowl 70 and a further type of bowl 75. The control system according to this embodiment takes the image taken from the 3D camera and conducts a depth analysis.

Articles handled by such a conveyor system will have both an image taken as shown in FIG. 2A and a depth image as shown in FIG. 2B whereas traditional vision recognition is achieved by template matching. This is not appropriate for the present invention. As objects are not flat and may fall onto the conveyor in any orientation, a template matching approach using a two dimensional camera is unreliable. Further, in order for the control system to engage the end-effector, some information on the height of the article is required. A two dimensional camera cannot provide this. The object recognition system according to the present invention in this embodiment therefore uses a "background subtraction" process in order for the article to be detected.

FIG. 3 shows a further arrangement of the system according to one embodiment of the present invention. Here a pick and place system 90 comprising a drive system 95 operating an end-effector 100 to remove articles from the conveyor 88 and place them in one of two respective bins 105, 110. Thus, the means of driving the end-effector may vary according to design parameters and still fall within the present invention.

The pick and place system of FIG. 3 shows an articulated robotic arm 95 which is rotatable so as to engage an article from the conveyor 88, lift the article into a particular position and rotate to the appropriate bin 105, 110.

Figure 4:
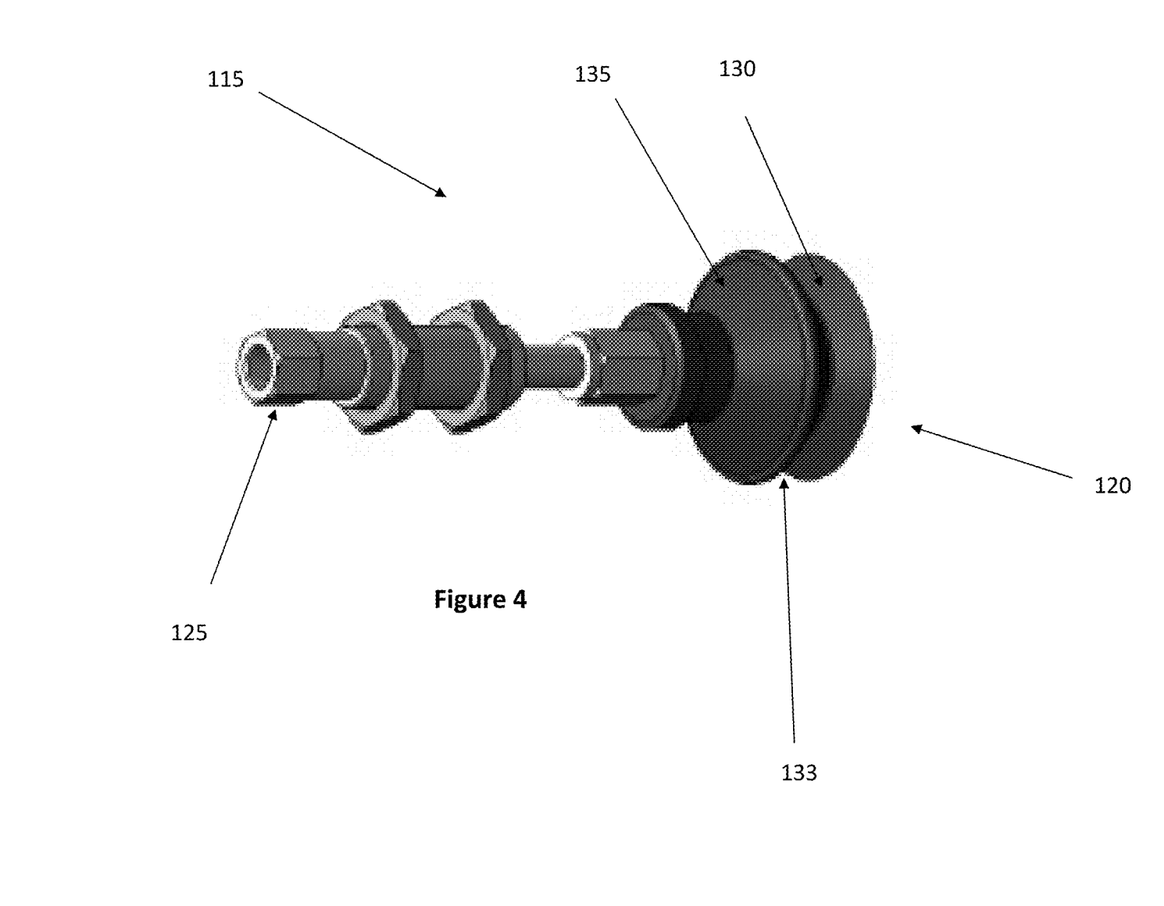
FIG. 4 is an elevation view of an end-effector of the sorting system according to one embodiment of the present invention.

FIG. 4 shows one example of an end-effector 115, in this case, operated through a suction cup 120. The end-effector according to this embodiment is designed to pick and place a variety of articles including bowls and dishes. As the articles are very different in terms of size, shape and material (for instance plastic, glass or ceramic) the means of engaging these articles must be able to accommodate a wide range of variation. Because all of these items will be mixed on the conveyor, the end-effector must be able to achieve this result without having to change the nature of the end-effector and therefore will need to be selected in order to be as flexible as possible. In terms of the industrial dishwasher application in this embodiment, the suction cup 120 design is particularly useful.

When used with a 3-dimensional camera, the moving conveyor belt makes estimation of the precise pick-up position of the article very difficult. Therefore, the tolerance required for the end-effector may be relatively large both in terms of selecting the most appropriate engagement point on the article as well as managing the positioning of the end-effector where the article is relatively small. To this end, the designer for a particular application may use a grip such as articulated clamps which can emulate an operator's hand. Alternatively, the suction cup as shown in FIG. 4 may also be appropriate.

A suction cup has a degree of advantage in that it can pick up an article from the centre of the article regardless of the size of the object whereas a gripper must encompass the article in order to engage it sufficiently. Secondly, the pick-up point on the object is relatively in material. As once it is engaged on lifting, it will achieve a natural position.

The suction cup 120 may have several layers 130, 135. This provides a larger tolerance of operational angle to the object surface. Further, the end-effector 115 may provide a spring so as to provide a tolerance in the vertical direction such as 2 cm subject to the type of article being engaged. This tolerance 133 also provides protection to prevent the end-effector 115 contacting the articles in a manner which may crush the article if the location position is miscalculated by the control system. Thus, the tolerance will be a function of the margin for error in detecting the article by the control system.

Figure 5:
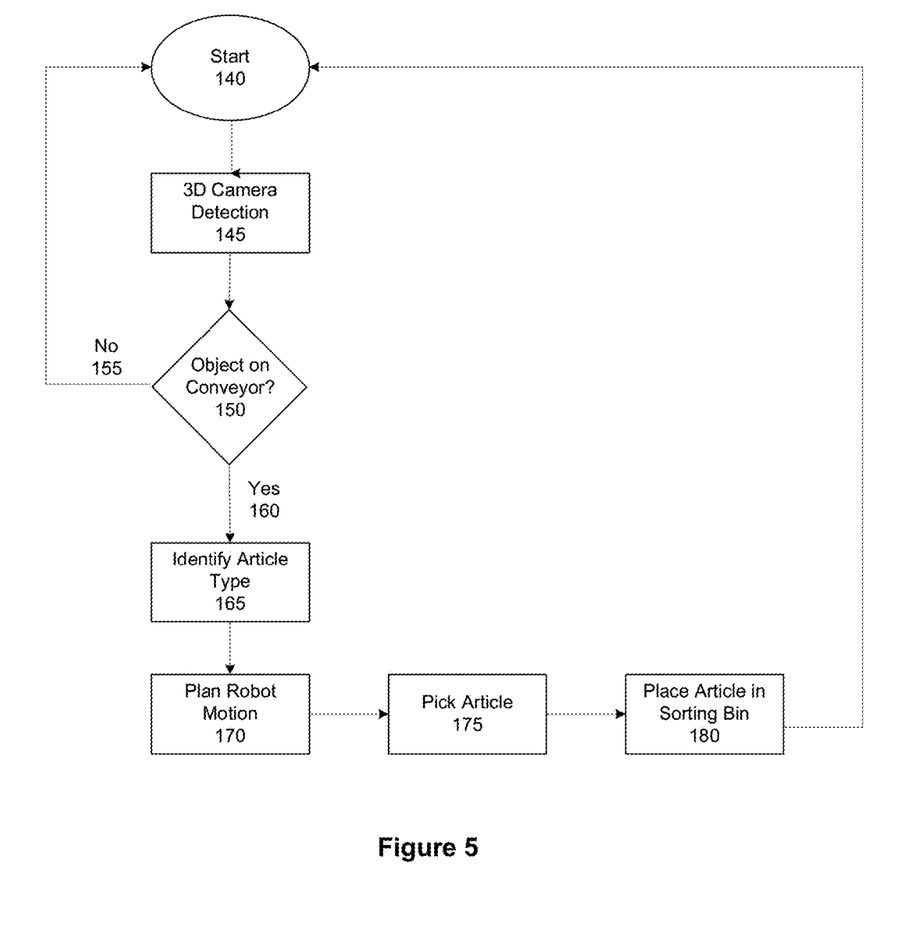
FIG. 5 is a flow diagram of the object recognition system logic according to one embodiment of the present invention.

FIG. 5 shows the process flow for the identification of the article. The process starts 140 from 3D camera. When 3D camera detects 145 some articles on the moving conveyor belt, it will identify its position 150 and article type 165. This information is then passed to software to plan the motion of industrial robot 170. The industrial robot picks up 175 the article from expected position and places it down to the corresponding sorting bin. After that, industrial robot returns to its idle position and wait for the next article.

Traditional pick and place robots may only pick up and place down articles from known and fixed positions, following pre-programmed sequential paths to complete the tasks. For such applications, the challenges are usually the end-effector design and workspace arrangement.

However, for the present invention, such repetitive robot cannot fulfill the tasks required given the diversity of articles and speed of the conveyor. The position of dishes and bowls on the conveyor belt is almost random and cannot be predicted. To pick up dishes and bowls from moving conveyor belt, the robotic system has to detect and identify each items on the conveyor belt.

There are several challenges of developing the perception system and a good perception system is the key function for the intelligent robotic material handling system. The dishes and bowls have a large variety of types, each with different sizes and shapes. The requirement is to pick up dishes and bowls and stack up them of same type nicely. In another word, the robot has to perform sorting operation. Without knowing the type of the item, the robot cannot determine the place to drop the item. Therefore, perception system has to perform three tasks: detection, recognition and positioning.

Conventional vision guided robots use 2D camera mounting on top of the conveyor belts and detect anything which is not a part of the conveyor. This approach is based on the assumption that the color of conveyor belt is known and the color of object is significantly different from the conveyor. However, for this project, the color of dishes and bowls are unknown. Each source may have their own preferences of color and design their bowls or dishes with any patterns. In addition, there might be dirt or waste falling on the conveyor belt to 'change' its color. This could annoy detection system as well. As a result, detecting objects relying on 2D vision may not be reliable.

The object recognition system used to identify the article may be any one of a number of standard commercially available machine vision systems used for the identification of objects using automated image analysis. The characteristic shape of the article may be sufficient for the machine vision systems used. The detector for the object recognition system may include camera, which may be a 3 dimensional camera in order to identify the object through depth perception. Which category of camera used, and the object recognition system adopted, will be at the discretion of the operator when designing a system falling within the scope of the present invention.

In this regard, two approaches may be used, being pattern recognition and feature-based geometric recognition. With the former, stored images of objects may be identified as representing patterns within a more complex. For feature-based geometric recognition, an object may be identified from a range of images of the object taken from different perspectives such that the comparison is made with each different view. Given the view of the articles may be from a wide variety of orientations, it is likely the database will require a large number of images in order to adequate allow for such variation. The actual number of images will be a matter of design for each individual application of the invention. For instance, the use of crates to hold the articles, which may also include racks may limit the variable positions of the articles which may also limit the number of images required for the database.

Figure 6A:
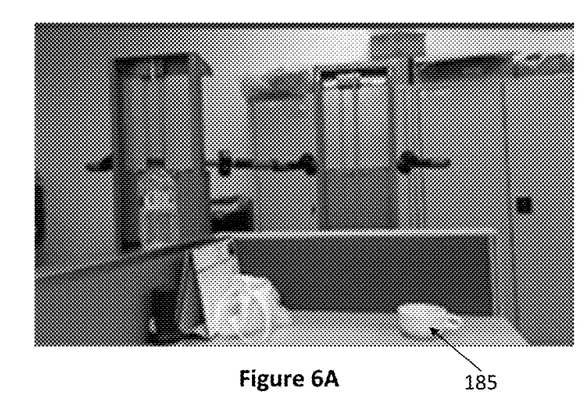
FIGS. 6A to 6C are images from the object recognition system for progressive recognition of an article.
Figure 6B:
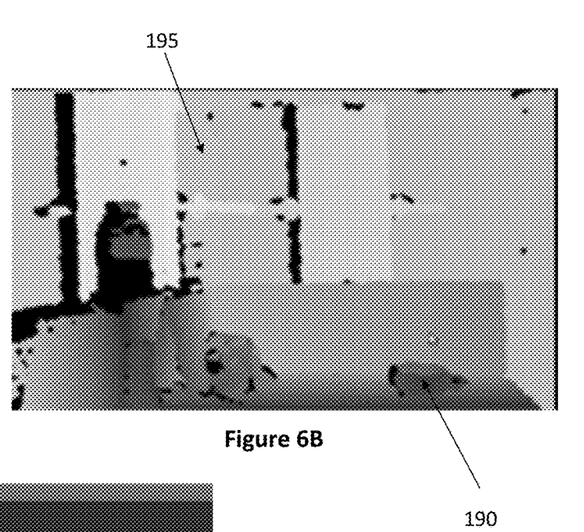
Figure 6C:
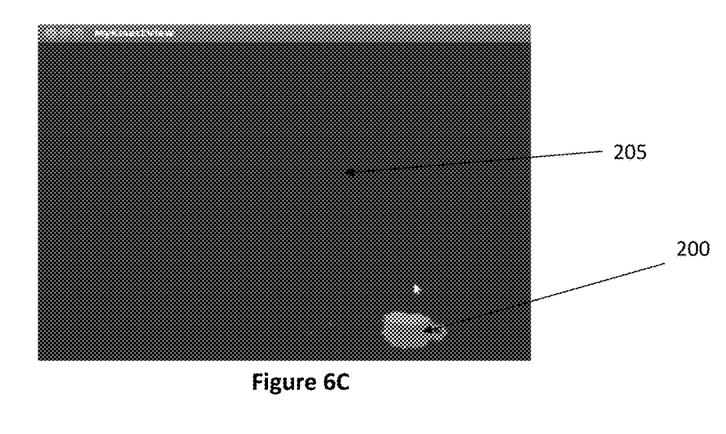
Figure 7:
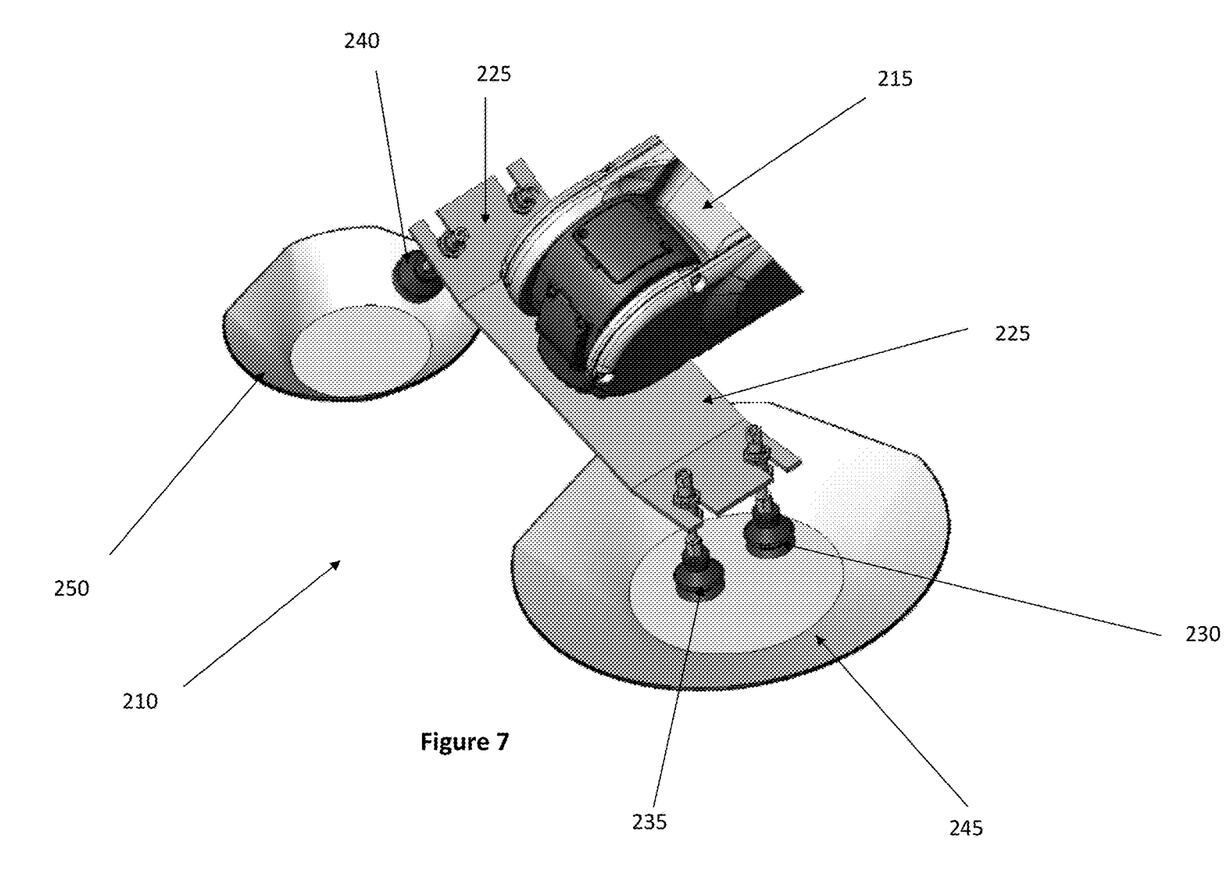
FIG. 7 is an isometric view of an end effector assembly according to a further embodiment of the present invention.

FIGS. 6A to 6C show a result of a process according to a further embodiment of the present invention. FIG. 6A shows an image of an article 185, in this case a cup, within a complex environment. Using a depth perception camera, the image may be modified so as to define a "background" 195 and the article 190. By then eliminating the background 205 from the image, the remaining article 200 can be readily identified for engagement by the end-effector. FIG. 7 demonstrates the use of multi-suction-cup end-effector assembly 210. The end-effector assembly 210 has an arm 215 to which is mounted two branches 220, 225. The branches 220, 225 each have two suction cups 230, 235, 240 mounted thereto. Each branch 220, 225 can capture one individual article. For instance, for the large plate 245, the end effectors 230, 235 have engaged the plate providing a stable and redundant engagement ensuring the article is securely held prior to placement in a sorting bin. The end effector assembly 210, having two branches, also allows a second article, in this case a smaller plate 250, to be engaged by the second branch 225 without disruption to the first branch 220.

A possible sequence of engagement could therefore include:
1. Pick article A
2. Pick article B
3. Move to sorting bin area
4. Place article A to sorting bin A
5. Place article B to sorting bin B
6. Move back to conveyor area An advantage of the two branch end effector assembly includes further reducing the cycle time of pick-and-place action of moving each article. The area of picking may be relatively far from the area of sorting bins. Since the cycle time may be a function of the travel distance of the robot arm and articles are very near to each other on the conveyor, it is easier for the robot arm to travel in short distance but not in long distance. The two branch end effector assembly only requires two short distance movements and two long distance movements to place two articles, while it takes four long distance movement to place two articles one by one. Therefore, it is more efficient of moving multiple articles at once, rather than moving them one by one.

It will be appreciated, in achieving further benefits that the end effector assembly may include more than two branches. To this end the assembly could include three or four branches, depending on the size of articles. As a non-exhaustive list, the optimum number of branches may then be a function of any one or a combination of:
Article size;
Distance from conveyor to sorting bin;
Speed of conveyor;
Density of articles on conveyor.

The invention claimed is:
1. A material handling system comprising:
a platform for receiving a plurality of articles;
a plurality of sorting bins, each bin in corresponding to an article type;

an object recognition system for identifying the article on the platform and categorizing said article by specific article type;

said object recognition system including a 3D detector for detecting said article and a database containing data on characteristics of article types; said 3D detector arranged to capture at least one two-dimensional image, and at least one depth image of said article; and an article engagement assembly for engaging and delivering said article to said corresponding sorting bin;

wherein the object recognition system is arranged to: digitally remove background from said captured depth image, and identify the article based upon the data within said database, and instruct the article engagement assembly to engage and place the article in said sorting bin, wherein said data includes a range of images of the article taken from different perspectives, wherein the article engagement assembly includes an end-effector for engaging the article, said end-effector mounted to a robotic arm, said robotic arm arranged to move said end-effector from the platform to said sorting bins;

wherein said robotic arm including a plurality of branches each having at least one end effector mounted thereto, and wherein the article engagement assembly and the 3D detector are arranged to be separate from each other such that the depth image of said article also includes said end-effector in the depth image.

2. The system according to claim 1, wherein said 3D detector is a 3D camera and the data contained by said database includes image data, said object recognition system arranged to compare said captured two-dimensional image with images from said database.

3. The system according to claim 1, wherein said end-effector includes suction cups for engaging said article.

4. The system according to claim 1, wherein the robotic arm includes a plurality of branches each having two end effectors mounted thereto.

5. The system according to claim 1, wherein the material handling system is a conveyor system, with the platform part of a conveyor of said conveyor system.

6. The system according to claim 5, wherein the platform is delivered by a conveyor to a designated location for handling of said articles.

7. The system according to claim 1, wherein each sorting bin includes a container on a sliding base and enmeshed in a security fence.

8. The system according to claim 7, wherein the security fence is arranged to be locked by electro-magnet lock controlled by system digital I/O output.

9. The system according to claim 7, wherein each sorting bin is mounted with manual push button and proximity sensors to detect the loads of placed articles.

10. The system according to claim 9, wherein the system is arranged such that on activating the push buttons or the proximity sensor signals that on a sorting bin being full, no further articles are placed into the respective bin.

11. A method for identifying and sorting an article, said method comprising the steps of:

detecting the presence of the article by a 3D detector, said detector arranged to obtain at least one two-dimensional image, and at least one depth image of said article;

digitally removing background from said captured depth image;

comparing captured two-dimensional image of said detected article with images contained on a database, wherein said data includes a range of images of the article taken from different perspectives;

locating the position and orientation of the article from the two-dimensional and depth images and transform such information into a motion profile for at least one robotic arm;

categorizing said article as a specific article type based upon said comparison;

engaging the article based upon said location information, with at least one end effector located on one of a plurality of branches of a robotic arm; and delivering the article to a sorting bin corresponding to the categorized article type, wherein the robotic arm and the 3D detector are arranged to be separate from each other such that the depth image of said article also includes said end-effector in the depth image.

12. The method according to claim 11 wherein said database is pre-established using sample articles of finite different types;

each type in the database corresponding to any one or a combination of: shape, size and 3D point cloud of particular type of article.

13. The method according to claim 11, wherein said background includes everything the camera detects except the articles so that the articles can be extracted and localized from the image to provide location information of said articles;

the location information includes identified type of each article by matching with said database, the 3D position of each article and 3D orientation of each article.

14. The method according to claim 11, wherein the removing step includes:

capturing the image with a 3 dimensional camera so as to detect depth in said image;

distinguishing the article from the background in said captured image, and;

digitally removing the background so as to leave the article image only.

* * * * *